United States Patent [19]

Petersen et al.

[11] Patent Number: 5,738,462
[45] Date of Patent: Apr. 14, 1998

[54] LOCKING CLIP SYSTEM FOR SECURING PANELS TOGETHER

[75] Inventors: Kirk A. Petersen; Mark L. Wubben, both of Muscatine, Iowa

[73] Assignee: Hon Industries Inc., Muscatine, Iowa

[21] Appl. No.: 742,288

[22] Filed: Nov. 4, 1996

[51] Int. Cl.[6] ............ F16B 2/00; F16B 21/18; A47B 47/00; A47B 96/18
[52] U.S. Cl. .......... 403/353; 403/316; 411/522; 108/157; 312/140.2; 312/265.6
[58] Field of Search ............ 24/292, 297, 546; 411/522, 523, 524, 480, 482, 531; 108/157; 312/140.2, 140.3, 265.6, 194, 195, 111; 403/353, 315, 316, 384, 348, 350

[56] References Cited

U.S. PATENT DOCUMENTS

| | | | |
|---|---|---|---|
| 2,566,886 | 9/1951 | Hartman | 248/56 |
| 2,709,390 | 5/1955 | Smith | 411/520 |
| 2,769,333 | 11/1956 | Reintjes | 411/531 X |
| 2,934,684 | 4/1960 | Fegan | 411/531 X |
| 3,178,987 | 4/1965 | Reese et al. | 411/523 |
| 4,601,247 | 7/1986 | Welch et al. | 108/152 |
| 4,786,119 | 11/1988 | Smuda | 312/195 |
| 4,802,802 | 2/1989 | Thurner | 411/480 X |

*Primary Examiner*—Kenneth J. Dorner
*Assistant Examiner*—William L. Miller
*Attorney, Agent, or Firm*—Jones, Day, Reavis & Pogue

[57] ABSTRACT

A system for interlocking together two panel members comprises a washer member having first and second washer portions connected by a necked down portion and having a through bore for receiving a fastener. The washer member is fastened to a side of a first panel member. A keyhole slot is formed in a second panel member, the slot having a relatively large opening portion leading to a relatively narrow opening portion. An aperture is formed in the second panel member spaced from the keyhole slot to define a bridge portion between the aperture and slot. A clip member attaches with a snap fit to the bridge portion and spans the keyhole slot terminating in an abutment portion at its distal end. When the two panels are interconnected, the necked down portion of the washer member is positioned within the narrow portion of the keyhole slot with the abutment portion of the clip retaining the washer therein. The system thereby provides for interlocking two panel members in a convenient manner with few readily manufactured components.

4 Claims, 3 Drawing Sheets

LOCKING CLIP SYSTEM FOR SECURING PANELS TOGETHER

BACKGROUND OF THE INVENTION

1. Field of the Invention

The present invention relates generally to a locking clip system for removably securing panels together and more particularly, to a locking clip which may be used advantageously for removably securing a desk top to a cabinet pedestal such that the top and pedestal may be conveniently assembled or disassembled.

2. Description of the Prior Art

In the construction of office furniture or the like, it is common to find desks assembled from a desk top panel having pedestals secured to its underside. The pedestals are often constructed of sheet metal and are provided with suitable drawers for filing documents or storing office supplies. The desk top may be fabricated from a variety of materials but is often a composite structure having a wood or wood-like appearance.

Because desks are often large bulky items, it is frequently desired to ship them to their ultimate destinations in disassembled form for assembly on site. In such case, a desk comprising pedestals and a desk top surface is usually assembled by fastening the pedestals to the desk top surface using screws or the like. However, such assembly can be a time consuming process involving the use of tools such as drills, wrenches, and screwdrivers. In recent times, it has been found desirable to secure the desk top surface to the pedestals using locking clip systems. One such locking clip system is disclosed, for example, in U.S. Pat. No. 4,786,119, issued to Smuda. In the Smuda arrangement, special bolts having conical heads are screwed into the undersurface of the desk top at the corners thereof. An upper surface of the pedestal is provided with keyhole slots corresponding to the number of locations of the bolts such that the heads of the bolts may be inserted into the keyhole slots. Once inserted into the slots, an aperture of a resilient clip engages the conical head of each bolt and retains the bolts in locked position in the slots. An advantage of such a clip system is that the desk top may be conveniently installed on the pedestals on site without the need for any tools. Likewise, the desk can be readily disassembled without tools by simply releasing the locking clips manually whereupon the top can be removed.

Although the locking clip system of the aforesaid Smuda patent provides a convenient means for desk assembly, it is desirable to improve that system from the standpoint of simplicity and consequent manufacturing cost. For example, in the Smuda system, the locking clip must be fastened to the pedestal by such means as rivets or by welding. Moreover, the bolt is an intricate member requiring several machining processes. Accordingly, it is desirable to provide an improved locking clip system comprising few simple parts and which are easily assembled in manufacture.

SUMMARY OF THE INVENTION

The present invention improves over the prior art by providing a system for interlocking together two panel members comprising a washer member having first and second washer portions connected by a necked down portion and having a through bore for receiving a fastener. The washer member is fastened to a side of a first panel member. A keyhole slot is formed in a second panel member, the slot having a relatively large opening portion leading to a relatively narrow opening portion. An aperture is formed in the second panel member spaced from the keyhole slot to define a bridge portion between the aperture and slot. A clip member attaches with a snap fit to the bridge portion and spans the keyhole slot terminating in an abutment portion at its distal end. When the two panels are interconnected, the necked down portion of the washer member is positioned within the narrow portion of the keyhole slot with the abutment portion of the clip retaining the washer therein. The system thereby provides a means for interlocking two panel members in a convenient manner with few readily manufactured components.

BRIEF DESCRIPTION OF THE DRAWINGS

The foregoing and other novel features and advantages of the invention will be better understood upon a reading of the following detailed description taken in conjunction with the accompanying drawings wherein.

DETAILED DESCRIPTION OF THE PREFERRED EMBODIMENT

Figure 1:
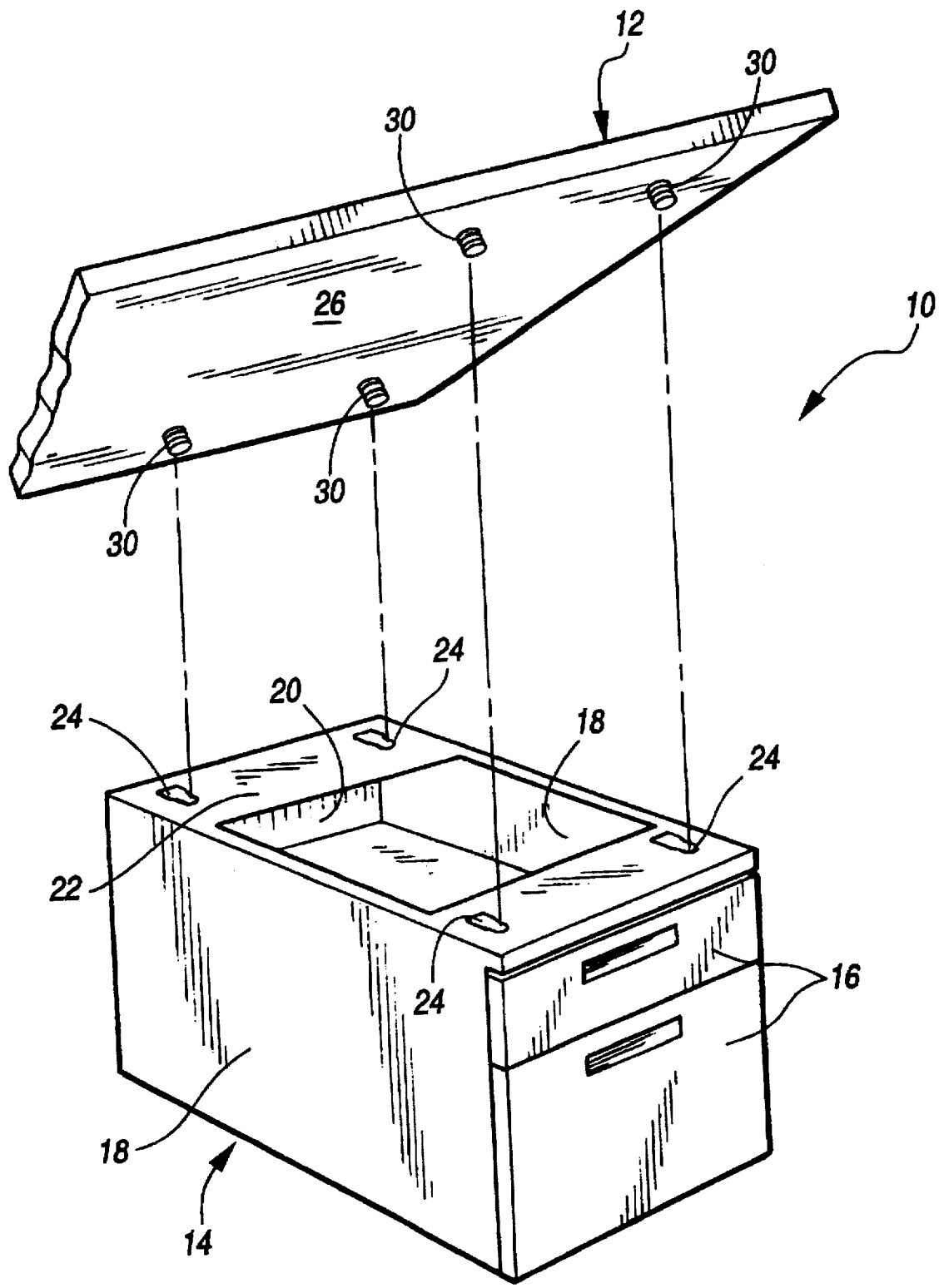
FIG. 1 is a partial exploded perspective view of a desk assembly using a system in accordance with the invention for interlocking the desk top to a base pedestal.

Referring now to the drawings, and initially to FIG. 1, a desk assembly, designated generally by the reference numeral 10 and shown only partially, includes a generally planar desk top 12 and a base pedestal 14. The base pedestal 14 may be constructed of suitable sheet metal having drawers 16 slidable from a front face. The pedestal 14 defines an enclosure having sidewalls 18, a rear wall 20 and at least a partial top surface 22. The top surface 22 is formed at its corners with keyhole slots 24. The desk top 12 may be formed from wood or a composite material and is provided on an under surface 26 thereof with washer members 30 which will be described in detail hereinafter. The washer members 30 are aligned in registry with the keyhole slots 24.

Figure 2:
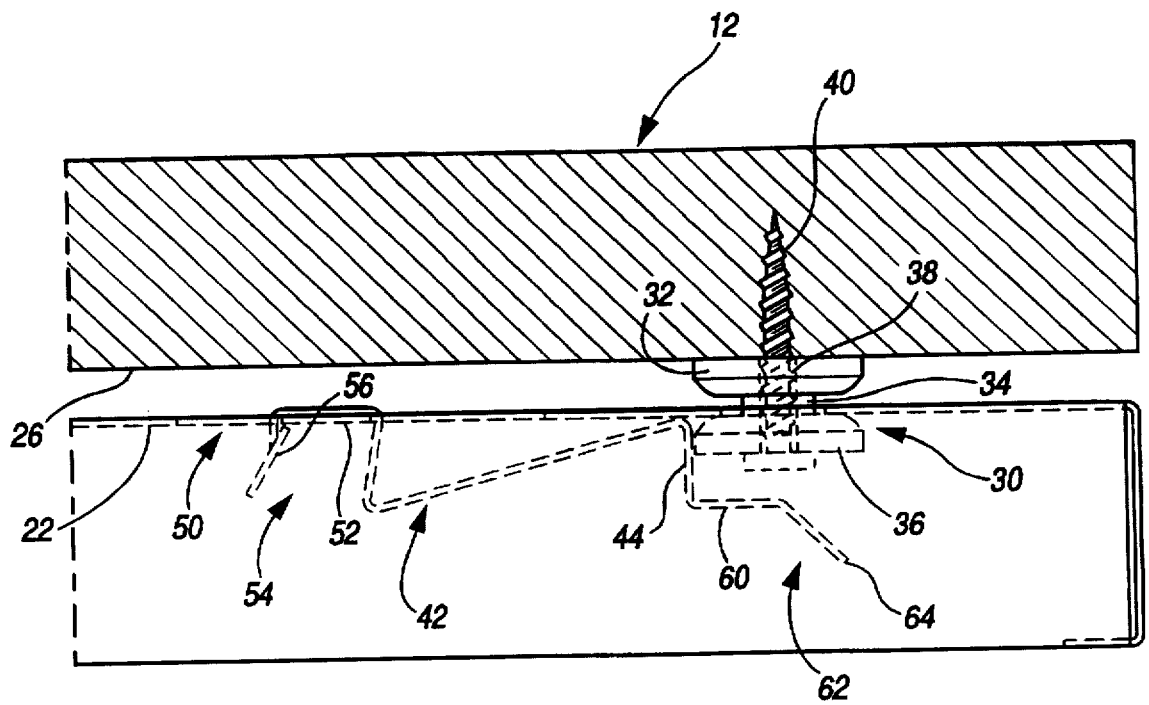
FIG. 2 is a side cross-sectional view of two panel members shown as interlocked together using a clip system in accordance with the invention.

Turning now to FIG. 2, a side view of a clip locking system in accordance with the invention is shown. As seen therein, the washer member 30 includes an upper washer portion 32 connected by a necked down center portion 34 to a lower washer portion 36. The washer member 30 is provided with a through bore 38 which receives a screw or bolt 40 such that the washer member 30 may be fastened to the underside surface 26 of the top 12. A spring clip 42 is provided with an abutment portion 44 in abutment with the lower washer portion 36 for purposes which will be described hereinafter.

Figure 3:
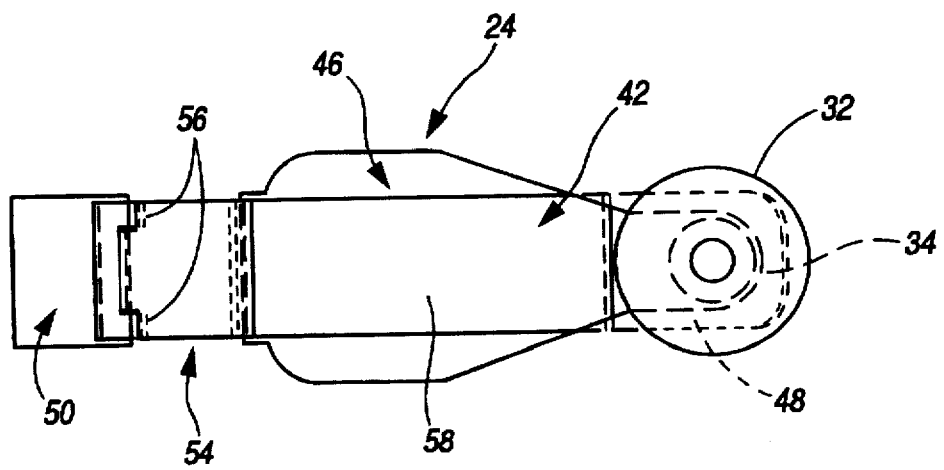
FIG. 3 is a top plan view of the present clip system.
Figure 4:
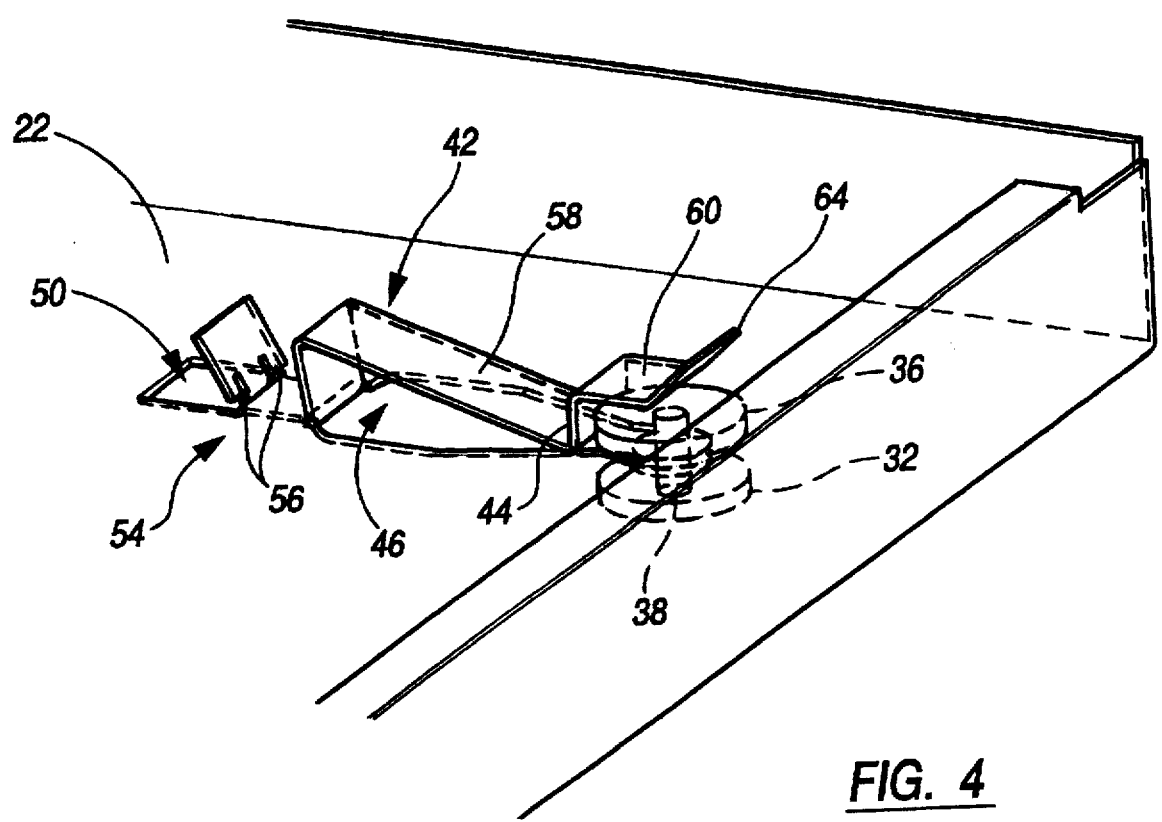
FIG. 4 is a bottom perspective view of the present clip system.

Referring now to FIGS. 3 and 4, the function of the system can be seen in detail. The keyhole slot 24 includes a relatively large opening portion 46 which tapers into a relatively narrow portion 48. The narrow portion 48 is only slightly larger in width than the necked down proton 34 of the washer member 30, while the relative large slot portion 46 is large enough to receive the washer portion 36. By this arrangement, the washer portion 36 may be inserted through the large slot portion 46 and urged such that the necked down portion 34 slides into the narrow slot portion 48. In such a disposition, the two panels 12 and 22 become locked together.

In accordance with the invention, the panel top surface 22 includes an aperture 50 spaced from the keyhole slot 24 to define a bridge portion 52 of the panel member 22. The spring clip 42 includes an end portion 54 formed in an overbent U-shape which is dimensioned to snap over and be retained by the bridge portion 52. The end portion 54 also includes a pair of tabs 56 which engage the underside of the bridge portion 52 and lock the clip 42 to the bridge portion 52 when the U-shaped portion is snapped onto the bridge portion 52. A center straight portion 58 of the clip 42 connects the end portion 54 of the clip 42 to the clip abutment portion 44 and spans the larger portion 46 of the keyhole slot 24. At a right angle to the abutment portion 44 of the clip 42 is a generally planar bearing portion 60 which assures that the clip 42 cannot drop completely through the keyhole slot 24 when not in use. Also, distal end 62 of the clip 24 includes an angled tab portion 64 which may be manually grasped to bend the clip 42 and release the abutment portion 44 from engagement with the washer portion 36 when it is desired to disconnect the two panels 12 and 22.

It can now be appreciated that a system in accordance with the invention provides a highly effective means for locking together two panel members such that the panel members may be conveniently assembled together or disassembled without the need for tools of any kind at the ultimate destination. The system is also simple and cost effective to manufacture. The spring clip 42 is capable of simply being manually snapped onto the bridge portion 52 in assembly without the need for any tools and is designed to be retained on the bridge portion 52 in a firm and positive manner. Moreover, the washer member 30 is a relatively simple member to machine as compared to prior art bolts or the like.

While the present invention has been described in connection with a preferred embodiment thereof, it will be apparent to those skilled in the art that many changes and modifications may be made without departing from the true spirit and scope of the present invention. Accordingly, it is intended by the appended claims to cover all such changes and modifications as come within the spirit and scope of the invention.

What is claimed is:

1. A system for interlocking together panel members in intimate relation comprising:

a first panel member a washer having a first washer portion connected by a necked down portion to a second washer portion and having a bore running through said washer and necked down portions, said bore dimensioned and configured to receive a fastener for securely fastening said washer member to a side of said first panel member;

a second panel member;

a keyhole slot formed in said second panel member, said slot having a first enlarged opening portion leading to a second reduced opening portion, said reduced opening portion being smaller in size than said second washer portion and larger in size than said necked down portion of said washer member, said keyhole slot having a longitudinal axis;

an aperture formed in said second panel member having a central axis aligned with said longitudinal axis of said keyhole slot and spaced from said keyhole slot to define a bridge portion of said second panel member between said aperture and said slot; and a clip member having a first end provided with an abutment portion and a second end provided with a generally U-shaped portion for snapping over and engaging said bridge portion;

wherein when said clip member is attached to said bridge portion, a central portion of said clip member spans said keyhole slot and said abutment portion is in position to urge said second washer portion into locked position within said reduced opening portion of said keyhole slot.

2. The system of claim 1 wherein said U-shaped portion includes at least one tab for engaging said bridge portion and locking said clip to said bridge portion.

3. The system of claim 1 wherein said clip member includes a bearing portion bent at right angles to said abutment portion.

4. The system of claim 3 wherein said clip member includes a tab portion bent at an angle to said bearing portion permitting manual grasping of said clip member.

* * * * *